United States Patent [19]

Walker et al.

[11] 4,145,287

[45] Mar. 20, 1979

[54] GREASE AND WATER SEPARATING APPARATUS

[76] Inventors: Harold L. Walker, 1204 E. 95th St., Tacoma, Wash. 98445; Don B. David, 33412 28th Pl. SW., Federal Way, Wash. 98003

[21] Appl. No.: 760,095

[22] Filed: Jan. 17, 1977

[51] Int. Cl.² ............................................. B01D 21/24
[52] U.S. Cl. .................................. 210/104; 210/299; 210/513; 210/532 R
[58] Field of Search ............... 210/532 P, 532 S, 115, 210/187, 416, 513, 540, 104, 299; 137/126, 127, 124

[56] References Cited

U.S. PATENT DOCUMENTS

| | | | |
|---|---|---|---|
| 449,267 | 3/1891 | Maraun | 137/127 |
| 636,610 | 11/1899 | Adam | 137/127 |
| 835,216 | 11/1906 | Crozier | 210/540 |
| 899,750 | 9/1908 | Miller | 137/126 |
| 2,328,027 | 8/1943 | Muller | 210/532 R |
| 2,530,054 | 11/1950 | Gordon | 210/532 X |
| 2,564,172 | 8/1957 | Raaberg et al. | 210/532 R X |
| 3,073,454 | 1/1963 | Waterman et al. | 210/532 P |
| 3,333,704 | 8/1967 | McGivern et al. | 137/124 X |
| 3,537,583 | 11/1970 | Wabner | 210/532 R |
| 3,804,252 | 4/1974 | Rishel | 210/532 R |
| 3,804,261 | 4/1974 | Whelen et al. | 210/532 |
| 3,957,402 | 5/1976 | Sloan | 210/416 R |
| 3,962,084 | 6/1976 | Nussbaum | 210/532 |
| 3,993,568 | 11/1976 | Fux | 210/532 R |
| 4,001,118 | 1/1977 | Enzmann | 210/187 |

*Primary Examiner*—Theodore A. Granger
*Attorney, Agent, or Firm*—Christensen, O'Connor, Johnson & Kindness

[57] ABSTRACT

An apparatus separates grease from a waste effluent containing a grease and water mixture prior to disposing of the effluent in a sanitary sewage system. A separator tank receives and holds the effluent while the mixture separates into an upper grease fraction and a lower water fraction. A means is provided for introducing the effluent into the tank either periodically or directly from the source of the effluent. A withdrawal means is associated with the tank for withdrawing at least a portion of the water fraction from the tank means when the effluent in the tank means reaches a first predetermined level. The withdrawal means stop withdrawing the water fraction from the separator tank when the effluent in the tank reaches a second predetermined level lower than the first predetermined level. The grease can be stored in th separator tank itself or can be transferred to a separate storage tank. The water fraction is disposed of directly to the sanitary sewer system while the grease is periodically collected for reprocessing into usable byproducts.

6 Claims, 12 Drawing Figures

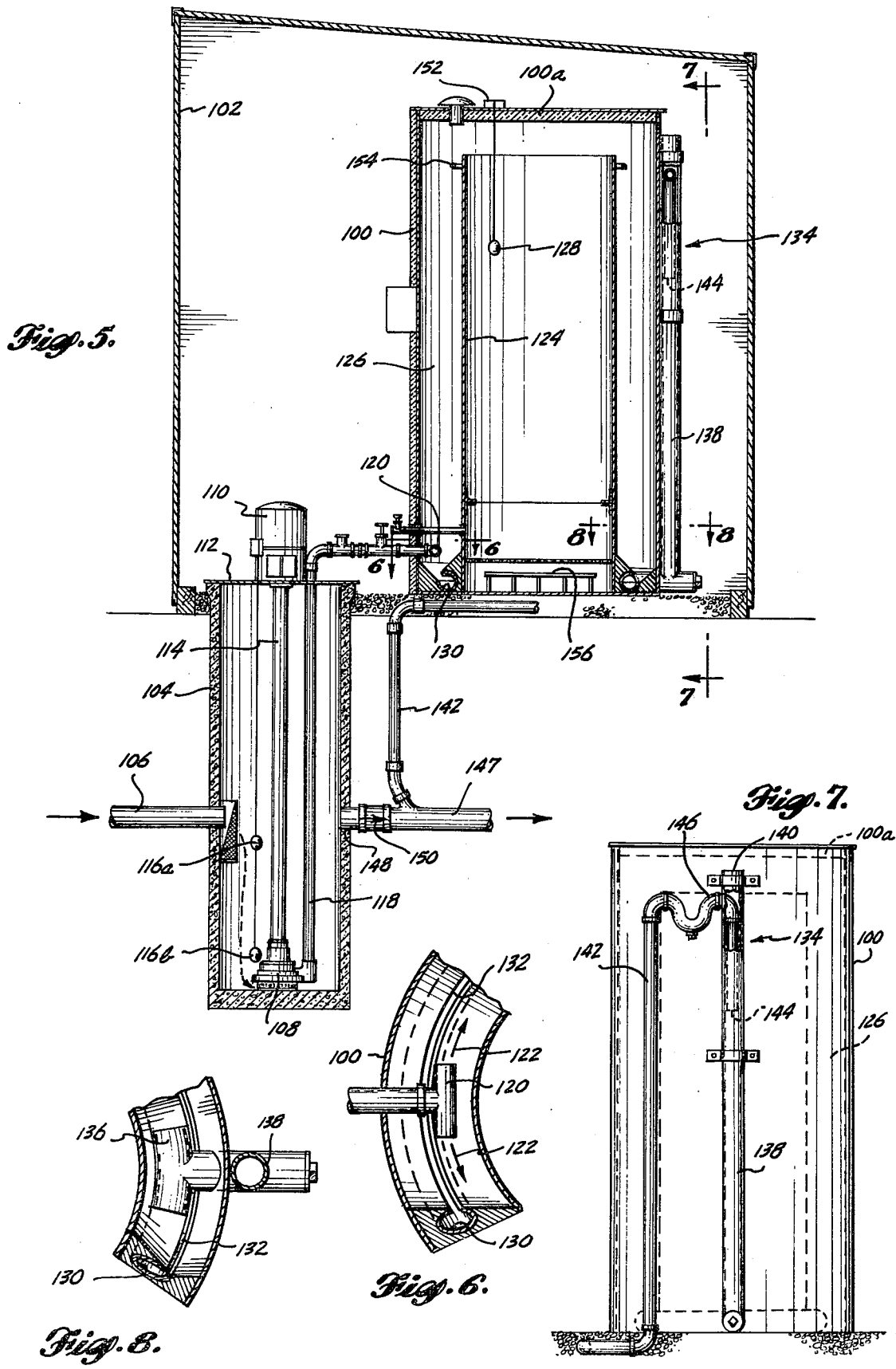

GREASE AND WATER SEPARATING APPARATUS

BACKGROUND OF THE INVENTION

The present invention relates to a waste disposal system and, more particularly, to an apparatus for receiving an effluent containing grease and water, for separating the effluent into grease and water fractions and for disposing of the water fraction in an effluent disposal system while retaining the grease fraction for separate disposal or processing into usable byproducts.

Restaurants and industrial facilities often have waste water from dishwashing facilities or other grease-containing effluents that must be disposed of during normal daily operation. Many times these grease-containing aqueous effluents are disposed of in sanitary sewer systems and consequently are processed in municipal sewage processing plants. The practice has become more prevalent for municipalities to surcharge those customers using the sanitary sewer systems when the effluent discharged by the operation contains a high percentage of grease as opposed to other, more readily biodegradable materials. This surcharge can be substantial and is normally passed on to the consumer of the goods or services of the commercial establishment.

It is an object of the present invention to reduce the amount of grease in waste effluents disposed of in sanitary sewer systems and consequently to eliminate or reduce the surcharge levied by municipalities on certain commercial establishments. It is a further object of the invention to provide an apparatus for separating the grease from the grease-containing aqueous effluent, and to dispose of the aqueous portion of the effluent in the sanitary sewer system while storing the grease-containing portion of the effluent. It is another object of the invention to separate and store the grease-containing portion of the effluent for reprocessing into usable and salable byproducts so as to reduce the overall cost of the separating apparatus. It is a further object of the present invention to provide a grease separating apparatus that requires little maintenance, that is essentially self-operating, and that is virtually failsafe.

SUMMARY OF THE INVENTION

In accordance with the foregoing objects, and other objects that will become clear to one of ordinary skill in the art after reading the following specification, the present invention provides an apparatus for separating grease from a waste effluent containing a grease and water mixture prior to disposing of the effluent. The device comprises a tank means for receiving and holding the effluent while the mixture separates into a water fraction and a grease fraction, means for introducing the effluent into the tank means, and withdrawal means for withdrawing at least a portion of the water fraction from the tank means when the effluent in the tank means reaches a first predetermined level and for stopping the withdrawal of the water fraction when the effluent in the tank means reaches a second predetermined level lower than the first predetermined level.

BRIEF DESCRIPTION OF THE DRAWINGS

A better understanding of the present invention can be derived by reading the ensuing specification in conjunction with the accompanying drawings wherein:

FIG. 5 is an elevation view in partial section of a second embodiment of the present invention;

FIG. 6 is a sectional view of a seqment of the apparatus taken along section line 6—6 of FIG. 5;

FIG. 7 is an end view of the apparatus of FIG. 5 taken along view line 7—7;

FIG. 8 is a sectional view of a segment of the apparatus taken substantially along section line 8—8 of FIG. 5;

DETAILED DESCRIPTION

Figure 1:
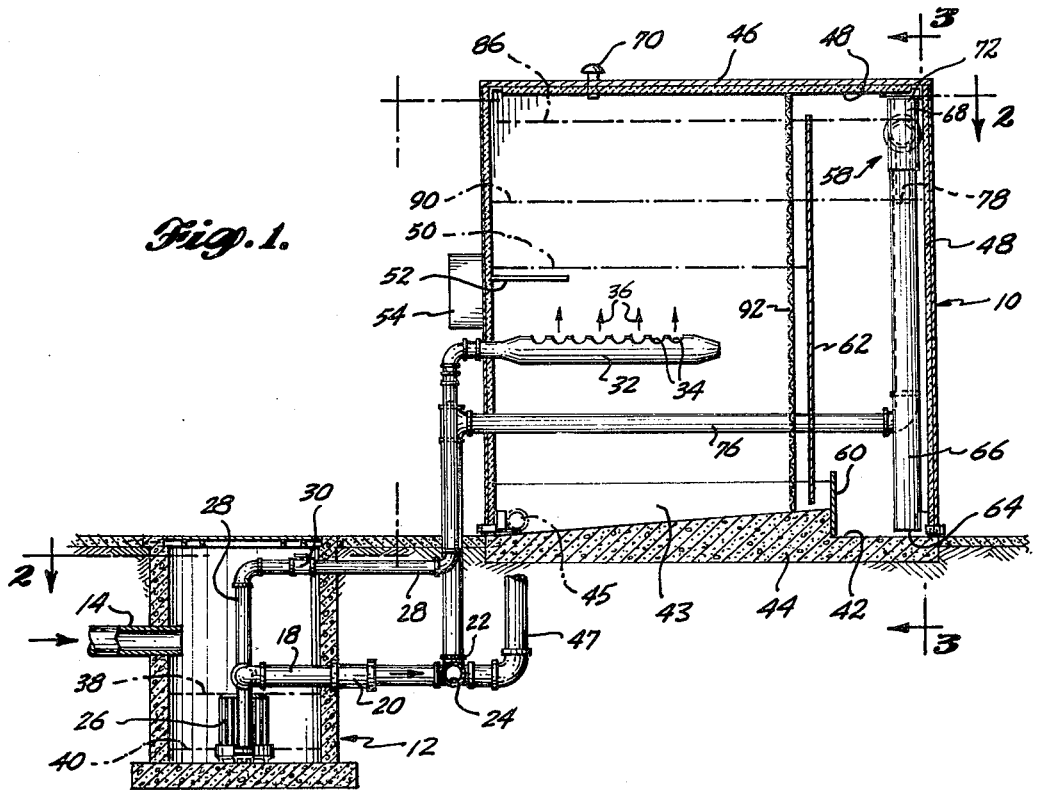
FIG. 1 is an elevation view in partial section of a first and preferred embodiment of the grease and water separating apparatus of the present invention.

Referring first to FIGS. 1 through 4, the preferred embodiment of the present invention includes a separator tank 10 and a sump 12. An effluent, for example, a restaurant dishwashing waste, is fed into the sump 12 via inlet conduit 14, the outlet of which is spaced above the bottom of the sump 12. The effluent contains a mixture of grease and water, sometimes emulsified and sometimes in partially separated form. Whenever the term "grease" is used herein, it is intended to encompass greases, oils and other fatty materials that will separate from a water carrier under the influence of their relative specific gravities and their immiscible nature. An overflow drain inlet 16 is spaced above the floor of the sump and is coupled to a drain conduit 18 containing an anti-backflow valve (or check valve) 20. The outlet of the drain conduit 18 is coupled by a T fitting 22 to a sanitary sewer pipe 24. When the effluent level in the sump reaches the height of the overflow drain inlet 16, the effluent in the sump 12 will flow directly into the sanitary sewer system, thus preventing the sump 12 from overflowing under all circumstances.

A submersible sump pump 26, driven by an electric motor, is positioned on the bottom of the sump 12 and has its inlet located adjacent the bottom of the sump. Pumps of this type are commercially available from plumbing supply houses. The outlet from the sump pump is coupled to a transfer conduit 28, which is routed through one of the end walls of the separator tank 10. A check valve 30 is interposed in the transfer conduit to prevent flow through the conduit into the sump from the separator tank. A sparger-like tube 32 is horizontally positioned within the separator tank about halfway up the height of the tank and is coupled to the transfer conduit 28 to receive effluent from the sump 12 and distribute it into the separator tank 10. The sparger-like tube discharges effluent into the separator tank through a plurality of apertures 34 along the top of the tube in the diection of arrows 36. The sump pump 26 is of the type that has its own internal level sensing and actuating controls. The level sensor incorporated into the sump pump unit energizes an electric drive motor when the effluent level in the sump reaches a predetermiend high level corresponding to dotted line 38 and de-energizes the electric pump drive motor when the level of effluent in the sump reaches a predetermined low level represented by the dotted line 40.

The separator tank is set on a concrete foundation 44 and is generally rectangular in construction, having end walls and side walls. A removable top or lid 46 is positioned over the upper edges of the separator tank walls. The separator tank walls and lid are insulated with a layer of insulation 48 to prevent substantial heat loss from the effluent, especially the grease fraction, present in the separator tank. Depending upon the level of effluent in the sump 12, effluent is periodically transferred to the separator tank. The effluent is allowed to stand in the separator tank during the interim when effluent is not being transfered to the tank, thus allowing the water to settle to the bottom while the grease rises to the top, forming a grease/water interface represented by dotted line 50. An electric heater rod 52 is positioned adjacent an end wall of the tank 10 and is thermostatically controlled via a controller situated in a control box 54 on the exterior of the tank end wall. The temperature of the effluent and especially the grease in the tank is maintained at a level sufficiently high to maintain the grease in a liquid state so that it can easily separate from the water fraction and so that it can easily be withdrawn from the separator tank by removing the lid and pumping the grease out of the tank.

Figure 2:
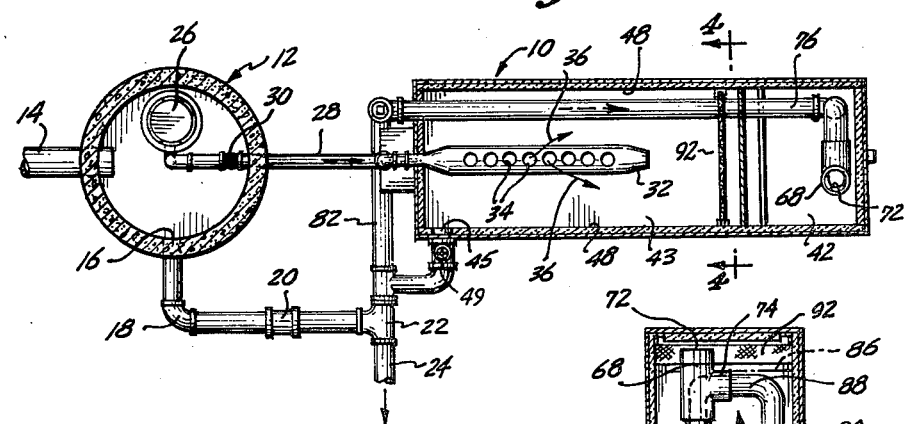
FIG. 2 is a horizontal sectional view taken substantially along section line 2—2 of FIG. 1.
Figure 3:
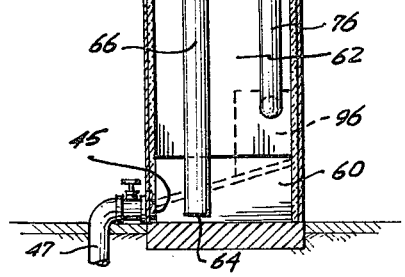
FIG. 3 is a vertical sectional view taken substantially along section line 3—3 of FIG. 1.
Figure 9:
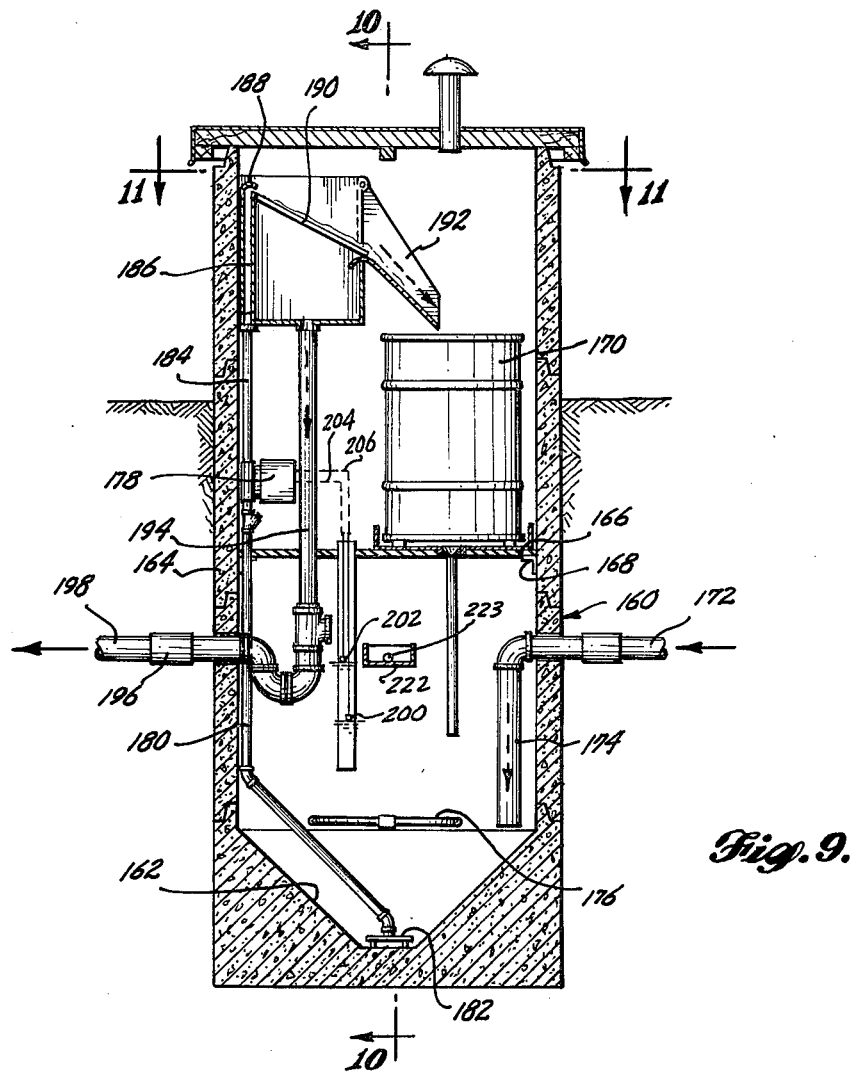
FIG. 9 is an elevation view in partial section of a third embodiment of the present invention.
Figure 11:
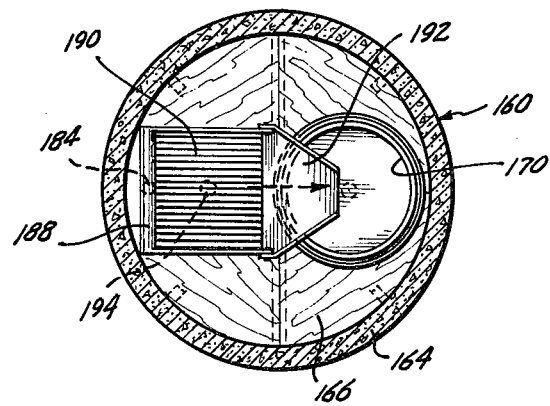
FIG. 11 is a cross-sectional view taken substantially along section line 11—11 of FIG. 9.

Referring to FIGS. 1, 2 and 3, water is periodically withdrawn from the separator tank, dependent upon the total effluent level in the separator tank, through a siphon 58 situated adjacent the opposite end wall of the tank from which the sparger-like tube 32 enters the tank. A set of baffles 60 and 62 are interposed in the flow path between the siphon 58 and the sparger-like tube 32. The lower baffle 60 extends transversely between the side walls of the tank 10 and upwardly a short distance from the horizontal floor portion 42 of the separator tank underlieing the inlet 64 to the siphon 58. The lower baffle 60 terminates in an upper, horizontal edge that is situated above the inlet 64 to the siphon entry tube 66. A skewed floor 43 extends from below the lower baffle 60 to the end wall through which the sparger-like tube 32 enters the separator tank. The skewed floor slopes toward one corner of the tank to direct all solid material in the separator tank to that corner. A drain outlet 45 is provided at the lowest point in the skewed floor and is connected to a drain conduit 47, in turn coupled by a T fitting to the sanitary sewer pipe 24. A manual shut-off valve 49 is provided in drain conduit 47 for periodically draining a portion of the water fraction from the separator tank to clean out accumulated solids. An upper baffle 62 has its lower edge situated below the upper edge of lower baffle 60 and parallel to the skewed floor 43. The upper baffle 62 extends almost all the way to the top of the separator tank 10 and terminates in an upper edge spaced a small distance downwardly from the lid 46 of the tank 10. The upper baffle in conjunction with the lower baffle prevents solid material in the effluent from reaching the siphon inlet 64.

The siphon 58 includes the entry tube 66 which has its inlet 64 positioned adjacent the bottom of the tank 10. The entry tube 66 is vertically oriented and has a T coupling 68 attached to its top. The straight through end of the T coupling 68 has an outlet 72 that is open to the interior of the tank and thus to the atmosphere through vent 70 on the tank lid 46. The T coupling outlet 72 is situated slightly above the upper edge of the upper baffle 62. The right angle portion 74 of the T coupling 68 contains a reducer for receiving an outlet tube 76 forming part of the siphon. The outlet tube 76 is coupled to the right angle portion 74 of the T fitting 68, extends into the T fitting 68, is routed downwardly into the entry tube 66, and terminates in an inlet 78 spaced below the T fitting outlet 72. The inlet end of the outlet tube 76 is spaced from the walls of the T fitting 68 and the interior walls of the entry tube 66 so as to form an annular channel that extends from the outlet tube inlet 78 upwardly and communicates with the T fitting outlet 72. From the right angle portion 74, the outlet tube 76 extends downwardly to a location above the upper edge of the lower baffle 60 and is then routed longitudinally along the tank 10 and extends through the opposite end wall of the tank. The oulet tube 76 is coupled to a drain conduit 82 in turn coupled to the sanitary sewer pipe 24.

In operation, when the upper surface of the effluent, that is, the upper surface of the liquid grease, present in the tank 10 reaches a high level 86 (indicated by a dotted line) above the upper reach 88 of the siphon 58, the water fraction present in the lower portion of the tank 10 will flow from the inlet 64, through the entry tube 66 of the siphon 58, and through the outlet tube 76 into the sanitary sewer pipe 24. Water will continue to flow through the siphon 58 until the upper surface of the effluent, i.e., the upper surface of the grease, drops to a level 90 (represented by a dotted line) slightly below the horizontal level of the outlet tube inlet 78. When this occurs, the siphon function will be terminated because air can then enter through the T fitting inlet 72 and consequently into the outlet tube inlet 78, breaking the siphon. The siphon will not begin functioning until the effluent level in the separator tank exceeds the height of the upper reach 88 of the siphon, i.e., the level 86.

Thus water is periodically and automatically drained from the separator tank to maintain the total effluent in the tank below the maximum level 86. As additional water is drained from the separator tank and as more effluent is transferred via sparger-like tube 32 from sump 12, the grease/water interface 50 will gradually fall as the build-up of grease in the separator tank occurs. After some period of operation, dependent upon the amount of grease in the effluent transferred into a separator tank, it will become necessary to remove all or part of the grease fraction present in the separator tank. This is accomplished by removing the lid 46 and inserting a suction tube from a mobile grease transporter (not shown) into the grease fraction and drawing the grease fraction out of the tank. When the grease is withdrawn, the device is again ready for operation over a substantial period of time during which water will be withdrawn through the siphon 58 and the grease fraction allowed to build up in the separator tank.

Figure 4:
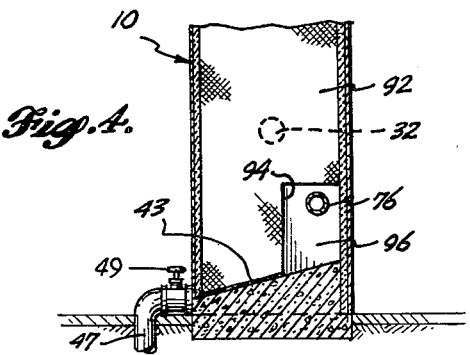
FIG. 4 is a partial, sectional view of the lower portion of the apparatus taken substantially along line 4—4 of FIG. 2.

Referring to FIG. 4, it has been found advantageous to position a screen 92 in the flow path thorugh the separator tank between the sparger-like tube 32 and the siphon inlet 64. Preferably the screen 92 is interposed in the flow path between the upper baffle 62 and the sparger-like tube 32. The screen prevents particulate matter from traveling toward the siphon inlet and thus potentially interfering with the operation of the siphon. The screen 92 extends transversely across the width of the separator tank and is positioned in vertical channels so that it can be withdrawn upwardly for periodic cleaning. The lower edge of the screen 92 contains a rectangular cut-out 94 that conforms to the shape of the rectangular plate 96 extending from the bottom of the tank 10 upwardly above the location of the siphon outlet tube 76. The siphon outlet tube 76 is routed through a bore in the plate 96 in its run across the longitudinal dimension of the tank from the siphon 58 to the drain conduit 82. The plate 96 is provided to eliminate any complicated fitting that might otherwise be necessary on the screen to assure that no solid matter can travel from the sparger-like tube 32 to the siphon inlet 64.

Referring now to FIGS. 5, 6, 7 and 8, the second embodiment of the invention differs somewhat in overall design but operates in substantially the same manner as the first embodiment explained in conjunction with FIGS. 1 through 4. However, the second embodiment includes a grease collector tank that provides for significantly longer operation of the grease separator without the need to remove the grease fraction. Consequently, the second embodiment requires only a relatively small separator tank compared to that required in the preferred embodiment. This embodiment, however, is more expensive to construct and would be applicable to larger industrial users that produce a large quantity of grease-bearing effluent.

Referring first to FIG. 5, the separator tank 100 is positioned above the ground in a small outbuilding 102. The sump 104 is positioned below the ground and is fed with effluent from the effluent source through inlet conduit 106. A pump 108 is situated adjacent the bottom of the sump 104 and is driven by an electric motor 110 located above the sump and mounted on a sump cover plate 112. A drive shaft (not shown) extends through a cover tube 114 from the pump motor 110 down to the pump 108. Level sensors 116 of conventional design are provided to energize the pump motor when the effluent level in the sump reaches the height of the upper sensor 116a and to de-energize the pump motor when the effluent level in the sump reaches the height of the lower level sensor 116b. The outlet of the pump 108 is connected to a transfer conduit 118, runs upwardly out of the sump 104, and breaches the cylindrical side wall of the separator tank 100. The transfer conduit 118 terminates in an outlet T fitting 120 (best seen in FIG. 6) that terminates adjacent the inside of the cylindrical wall of the separator tank to discharge effluent into the separator tank 100 in a tangential direction as shown by arrows 122 in FIG. 6.

Referring to FIGS. 5 and 7, a cylindrical grease storage tank 124 is concentrically positioned within the cylindrical separator tank 100, leaving an annular grease and water separation region 126 between the two tanks. The upper end of the grease storage tank 124 is open so that the accumulating grease fraction in the separator tank can overflow over the upper edges of the storage tank and be stored within. A grease level sensor 128 is positioned in the grease tank 124 to indicate when the grease level in the storage tank is reaching a nearly full level, thus indicating that the grease storage tank needs to be drained. The grease level sensor 128 is coupled to an alarm control box 152, the function of which is discussed below. The grease storage tank is emptied by removing the removable lid 100a from the separator tank 100 and drawing off the grease in a manner similar to that described in conjunction with the preferred embodiment.

An annular outlet pipe 130 is positioned in the bottom of the separator tank 100 at the bottom of the annular separation region 126. The outlet pipe 130 is best seen in FIGS. 5, 6 and 8. The outlet pipe has an annular, longitudinal slot 132 that extends around the base of the separator tank. The annular slot 132 serves as the inlet to the siphon 134, in this embodiment situated on the outside of the separator tank 100. A T fitting 136 is coupled to the annular pipe 130 adjacent the bottom of the siphon 134 and extends through the wall and is coupled to the siphon inlet riser 138. The top of the riser 138 has an outlet 140 communicating with the atmosphere. The siphon outlet pipe 142, which is coupled to sanitary sewer pipe 147, extends into the riser 138 and terminates in an inlet 144 interior of the riser 138. The siphon functions to drain water fraction from the annular separation region 126 in a manner very similar to the siphon described in conjunction with the first embodiment. That is, when the effluent level in the separation region 126 exceeds the height of the upper reach 146 of the siphon, a portion of the water fraction will be drained until the effluent level in the separation area 126 drops below the inlet 144 to the siphon outlet tube 142 to break the siphon function. The siphon outlet tube 142 is coupled to a sanitary sewer pipe 147.

A first electric heating coil 154 is positioned around the top of the grease storage tank in the separation area 146. This electrical heating coil maintains the grease in a liquid state so that it can overflow with no clogging problems into the grease storage tank. In addition, a second heating coil 156 is provided at the bottom of the storage tank to heat the grease in the tank to liquid form prior to removal of the grease from the storage tank.

As with the previous embodiment, the sewer pipe 147 is also coupled with an overflow pipe 148 that extends into the sump 104 at a location above the upper sump level sensor 116a. An anti-backflow valve 150 is interposed in the overflow pipe 148 to prevent material entering the sewer pipe 147 from the siphon oulet pipe 142 from flowing into the sump.

The second embodiment of the invention just described in conjunction with FIGS. 5 through 8 has the advantage of a self-contained grease storage tank 124 that is in essence integral with the separation tank 100. As the effluent level in the separation tank rises, the upper grease fraction will overflow into the grease storage tank and be stored there for periodic removal. As previously mentioned, the grease level sensor 128 will provide an alarm signal to an alarm control housed in alarm control box 152 on top of the lid 100a of the separator tank. One of ordinary skill will understand that the alarm signal can be conditioned to provide a visual or audible signal or both. For example, an alarm signal light can be positioned at the point in the effluent producing operation where it will readily be seen by an operator of the effluent producing equipment. The operator can thus request removal of the grease from the grease storage tank 124 only as necessary, reducing any requirement for periodic maintenance.

Referring now to FIGS. 9 through 12, the third embodiment of the present invention omits the sump and has only a single, cylindrically-shaped separation tank 160. The separation tank has a frustoconically shaped bottom 162 and upright wall 164. Effluent separation occurs only in the lower portion of the tank. The upper portion of the tank is separated from the lower portion by a circular platform 166 composed of plywood or other suitable material. The platform 166 is mounted on brackets 168 extending radially inwardly from the wall 164 of the separation tank 160. A particulate matter storage drum 170 is positioned on the platform. Inlet conduit 172 receives grease and water effluent from the effluent source and transfers it into the lower portion of the separation tank via downspout 174. The downspout 174 has its outlet positioned adjacent the upper end of the frustoconical bottom 162 of the tank. An electrical heating element 176 is positioned adjacent the outlet to maintain the effluent in the separation tank at a temperature sufficiently high to maintain the grease fraction of the effluent in a liquid state.

An electrically powered pump 178 is positioned above the circular platform 166. An inlet conduit 180 extends downwardly from the pump 178 and terminates in an inlet fitting 182 adjacent the frutoconical bottom 162 of the tank. The outlet pipe 184 from the pump extends upwardly to a solids separator 186 positioned adjacent and above the storage drum 170 and terminates in a manifold 188. Water fraction pumped from the separation tank 160 is distributed over a screen 190 located on the upper portion of the solids separator. Solid material pumped from the bottom of the separator tank with the water travels across the screen, through a trough 192 and is directed into the solids storage drum 170. The water fraction passes through the screen 190 into the collector portion of the separator 186 and is drained through an outlet pipe 194, which extends downwardly from the separator 186, through a trap and outwardly through the wall 164 of the separation tank 160. A fitting 196 couples the outlet pipe 194 to a sanitary sewer pipe 198.

The pump 178 is controlled by a pair of level sensors 200 and 202, electrically coupled to the electric driving motor for the pump 178 by leads 204 and 206, respectively. The level sensors 200 and 202 are designed to sense the level of the interface between the water fraction and the grease fraction. When the interface rises to the height of sensor 202, the pump 178 is energized to pump water up to the solids separator 186 to be drained therefrom by gravity to the sanitary sewer conduit 198. The pump continues to run until the interfaces falls below the height of sensor 200, at which point the pump is de-energized. This cycle is repeated as necessary, dependent upon the amount of additional effluent transferred to the separator tank 160 through the effluent inlet pipe 174.

Figure 10:
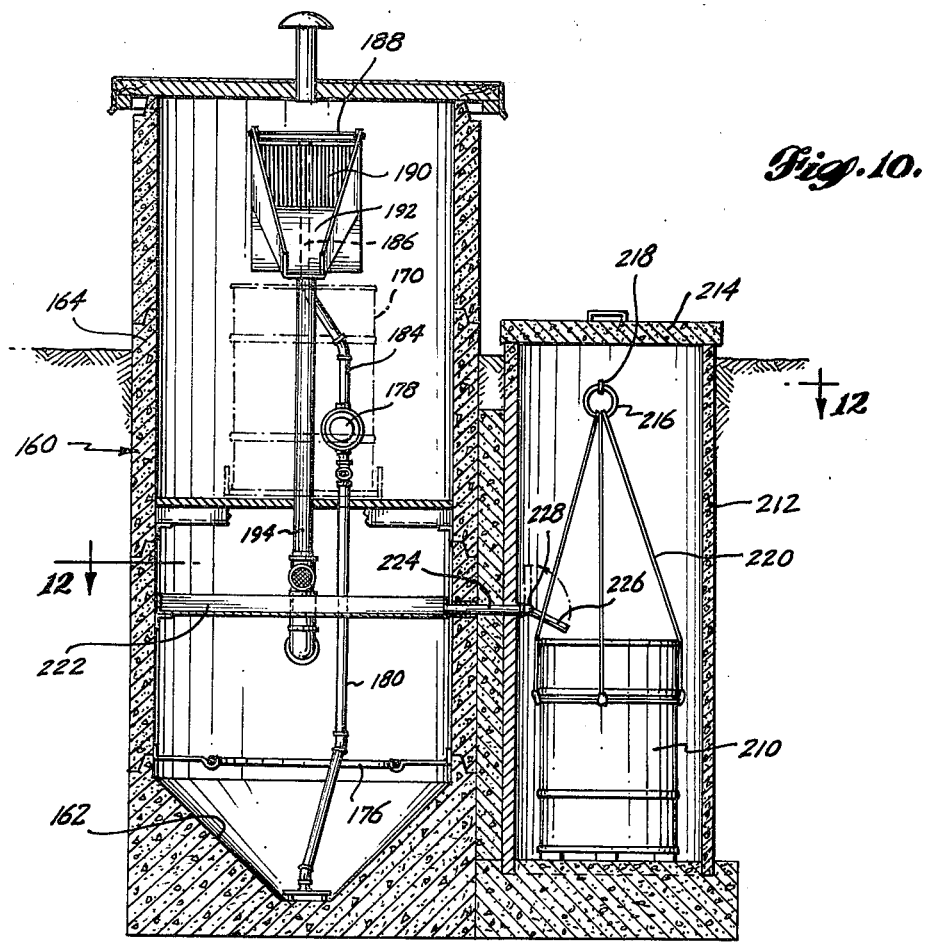
FIG. 10 is a second elevation view of the apparatus rotated 90° from that of FIG. 9 in partial section and taken substantially along section line 10—10 of FIG. 9.
Figure 12:
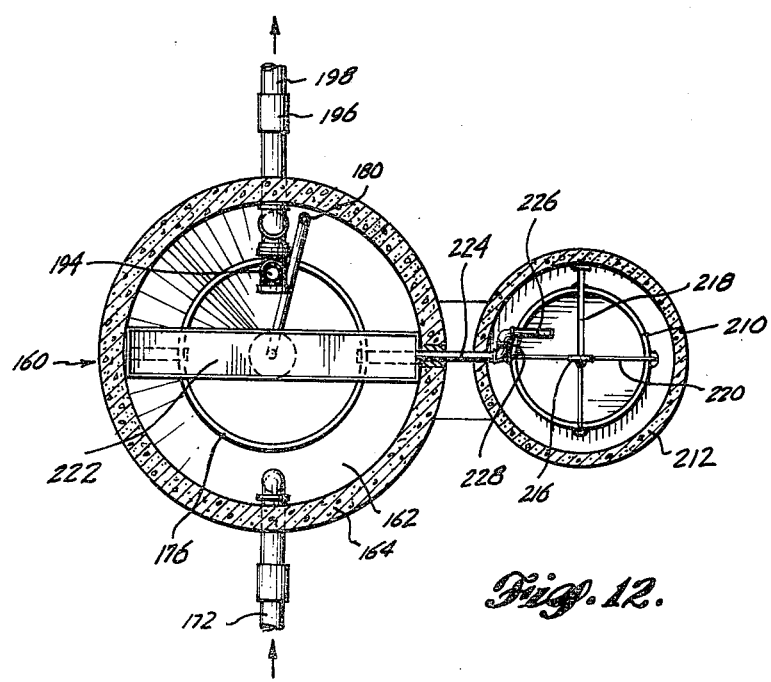
FIG. 12 is a cross-sectional view taken substantially along section line 12—12 of FIG. 10.

As shown best in FIGS. 10 and 12, a separate grease storage tank 210 is situated in underground well 212 adjacent the separator tank 160. The grease storage tank 210 rests on supports on the bottom of the well and can be removed and replaced from the well by removing the well lid 214 and hoisting upwardly on the sling 220. A sling ring 216 is temporarily hooked over a hook 218 extending radially inwardly from the well wall to provide ready access to the sling when necessary.

The grease is transferred from the separator tank 160 to the grease storage tank 210 via an overflow trough 222 positioned diametrically across the separator tank. The trough 222 has side walls terminating in upper horizontal edges that are positioned slightly above the location of upper level sensor 202. The side walls form a weir over which grease can flow into the trough. The trough 222 has an outlet 223 coupled to a grease transfer pipe 224 that extends through the sidewall of the separator tank and into the storage well 212. A shutoff fitting 226 is coupled to the end of grease transfer pipe 224. Normally, it extends downwardly toward the grease storage tank 210 so as to constantly drain any overflow from the trough into the storage tank 210. However, during removal, replacement, and/or emptying of the grease storage tank 210, the fitting 226 can be swung about threaded elbows 228 to an upright position so as to stop flow from the trough 222 into the storage well 212.

The third embodiment has the advantage that no sump is required, however, electrical energy is used to withdraw the water fraction from the separator tank and transfer it to the sanitary sewer conduit. This embodiment also has the capability of separating and storing solids present in the effluent. The third embodiment provides a separate storage facility for the separated grease that can be serviced without disturbing the main separator tank.

After reading the foregoing specification, one of ordinary skill will be able to effect various changes, substitutions of equivalents and other alterations without departing from the broad concepts disclosed herein. It is therefore intended that the scope of protection granted by Letters Patent hereon be limted only the the definition contained in the appended claims and equivalents thereof.

What is claimed is:

1. A device for separating and recovering grease from a waste effluent containing mixed grease and water, and for disposing of said water, comprising:

a separator tank for receiving and holding said effluent while said mixed grease and water separate into a lower water fraction and an upper grease fraction by action of gravity and natural immiscibility, said separator tank having an upper portion, a lower portion, and a wall with an inlet in said wall for introducing said effluent into said separator tank;

a sump for receiving and collecting said effluent from a source of effluent;

a sump pump for selectively pumping said effluent from said sump into said separator tank, said sump pump having an inlet operatively connected to said sump and having an outlet in fluid communication with said inlet of said separator tank;

level sensing and actuating means for actuating said sump pump when said effluent in said sump rises to a predetermined high level and deactuating said sump pump when said effluent in said sump falls to a predetermined low level;

a siphon means for automatically and intermittently withdrawing a portion of said lower water fraction from said lower portion of said separator tank when the upper surface of said upper grease fraction in said separator tank rises to a first predetermined level in said upper portion of said separator tank, and for stopping the withdrawal of said lower water fraction when the upper surface of said upper grease fraction in said separator tank falls to a second predetermined level in said upper portion of said separator tank, said second predetermined level being lower than said first predetermined level, said siphon means including an entry tube and an outlet tube, said entry tube having a wall and having an inlet in fluid communication with said lower portion of said separator tank and extending upwardly therefrom to said upper portion of said separator tank, said entry tube terminating in an opening to the atmosphere above said first predetermined level, said entry tube having an inside diameter larger than the outside diameter of said outlet tube, said outlet tube having an outlet tube inlet inside said entry tube at said second predetermined level, said outlet tube extending upwardly from said outlet tube inlet and passing through said wall of said entry tube at a level between said first and second predetermined levels and having an upper reach at said first predetermined level, said outlet tube extending downwardly from said upper reach and through said wall of said separator tank at a level below said second predetermined level, said outlet tube terminating in a coupling for placing said outlet tube in fluid communication with a drain.

2. A device for separating and recovering grease from a waste effluent containing mixed grease and water, and for disposing of said water, comprising:

a separator tank for receiving and holding said effluent while said mixed grease and water separate into a lower water fraction and an upper grease fraction by action of gravity and natural immiscibility, said separator tank having an upper portion and a lower portion, said separator tank having a wall with an inlet in said wall for introducing said effluent into said separator tank, said inlet being at a level between said upper and lower portions of said separator tank, said separator tank having a sloped floor portion and a recessed floor portion, said recessed floor portion being adjacent to and below the uppermost portion of said sloped floor portion;

a first baffle positioned in said separator tank adjacent said uppermost portion of said sloped floor portion and extending from said uppermost portion of said sloped floor portion to a location spaced above said sloped floor portion, said first baffle terminating in a substantially horizontal upper edge;

a second baffle having a lower edge positioned below said upper edge of said first baffle and spaced above said sloped floor portion, said second baffle terminating in an upper edge adjacent said upper portion of said separator tank, said first baffle being positioned between said second baffle and said recessed portion, said second baffle being further positioned between said first baffle and said inlet to said separator tank, said first and second baffles both extending across said separator tank such that flow of said lower water fraction can only occur along a path under said second baffle and over said first baffle;

a sump for receiving and collecting said effluent from a source of effluent, a sump pump for periodically pumping said effluent from said sump into said separator tank, said sump pump having an inlet operatively connected to said sump and having an outlet in fluid communication with said inlet of said separator tank;

level sensing and actuating means for actuating said sump pump when said effluent in said sump rises to a predetermined high level and deactuating said sump pump when said effluent in said sump falls to a predetermined low level;

a siphon means for automatically and intermittently withdrawing a portion of said lower water fraction from said lower portion of said separator tank, said siphon means automatically engaging when the upper surface of said upper grease fraction in said separator tank rises to a first predetermined level in said upper portion of said separator tank and automtically stopping the withdrawal of said water fraction when the upper surface of said upper grease fraction falls to a second predetermined level in said upper portion of said separator tank, said second predetermined level being lower than said first predetermined level, said siphon means including an entry tube and an outlet tube, said entry tube having a wall and having an inlet in fluid communication with said lower portion of said separator tank, said entry tube inlet being adjacent to and spaced above said recessed floor portion, said entry tube extending upwardly from said inlet to said upper portion of said separator tank, said entry tube terminating in an opening to the atmosphere above said first predetermined level, said entry tube having an inside diameter larger than the outside diameter of said outlet tube, said outlet tube having an outlet tube inlet inside said entry tube at said second predetermined level, said outlet tube extending upwardly from said outlet tube inlet and passing through said wall of said entry tube at a level between said first and second predetermined levels and having an upper reach at said first predetermined level, said outlet tube extending downwardly from said upper reach and through said wall of said separator tank at a level below said second predetermined level, said outlet tube terminating in a coupling for placing said outlet tube in fluid communication with a drain.

3. The device of claim 2 further comprising a drain conduit, a separator tank drain with an inlet at the lowermost portion of said sloped floor portion, a valve interposed between and operably connecting said separator tank drain and said drain conduit, a sump overflow pipe in fluid communication with said drain conduit, said sump overflow pipe having an inlet in fluid communication with said sump and spaced above said predetermined high level, and a means operably connecting said drain conduit to said coupling of said separator tank outlet tube.

4. A device for separating and recovering grease from a waste effluent containing mixed grease and water, and for disposing of said water, comprising:

a separator tank for receiving and holding said effluent while said mixed grease and water separate into a lower water fraction in an upper grease fraction by action of gravity and natural immiscibility, said separator tank having an upper portion and a lower portion, said separator tank being approximately cylindrically shaped, said separator tank having an inlet for introducing said effluent into said separator tank, said inlet being adjacent said lower portion of said separator tank, said inlet being so constructed and associated with said bottom portion of said separator tank as to discharge said effluent into said separator tank in a tangential direction relative to said separator tank;

a grease reservoir located in said separator tank, said grease reservoir having a width in cross section less than the width in cross section of said separator tank, said grease reservoir terminating in an upper opening defined by a substantially horizontal upper edge, said upper edge being located adjacent said upper portion of said separator tank;

a sump for receiving and collecting said effluent from a source of effluent;

a sump pump for periodically pumping said effluent from said sump into said separator tank, said sump pump having an inlet o operatively connected to said sump and having an outlet in fluid communication with said inlet of said separator tank;

level sensing and actuating means for actuating said sump pump when said effluent in said sump rises to a predetermined high level and deactuating said sump pump when said effluent in said sump falls to a predetermined low level;

a siphon means for automatically and intermittently withdrawing a portion of said lower water fraction from said lower portion of said separator tank, said siphon means automatically engaging when the upper surface of said upper grease fraction in said separator tank rises to a first predetermined level in said upper portion of said separator tank and automatically stopping the withdrawal of said water fraction whenever the upper surface of said upper grease fraction falls to a second predetermined level in said upper portion of said separator tank, said second predetermined level being lower than said first predetermined level, said first predetermined level being substantially the same as the level of said horizontal and upper edge of said grease reservoir, said siphon means including an entry tube and an outlet tube, said entry tube having a wall and having an entry tube inlet in fluid communication with said lower portion of said separator tank, said entry tube inlet being annular in configuration and recessed in said floor of said separator tank, the surface of said floor on each side of said entry tube inlet sloping upwardly from said inlet such that water withdrawn by said siphon means is withdrawn from the lowermost portion of said separator tank, said entry tube extending upwardly from said entry tube inlet to said upper portion of said separator tank, said entry tube terminating in an opening to the atmosphere above said first predetermined level, said entry tube having an inside diameter larger than the outisde diameter of said outlet tube, said outlet tube having an outlet tube inlet inside said entry tube at said second predetermined level, said outlet tube extending upwardly from said outlet tube inlet and passing through said wall of said entry tube at a level between said first and second predetermined levels and having an upper reach at said first predetermined level, said outlet tube extending downwardly from said upper reach and through said wall of said separator tank at a level below said second predetermined level, said outlet tube terminating in a coupling for placing said outlet in fluid communication with a drain.

5. The device of claim 4 further comprising a drain conduit, a sump overflow pipe in fluid communication with said sump and spaced above said predetermined high level in said sump, said sump overflow pipe being in fluid communication with said drain conduit, said drain conduit being in fluid communication with said coupling of said siphon means outlet tube.

6. A device for separating and recovering grease and solid matter from a waste effluent containing mixed grease, water and solid matter, and for disposing of said water, comprising:

a separator tank for receiving and holding said effluent while said mixed grease, water and solid matter separate into a lower water fraction and an upper grease fraction by action of gravity and natural immiscibility, said solid matter generally sinking into said lower water fraction, said separator tank having an upper portion, a central portion and a lower portion, said separator tank having a sloped floor, said separator tank having a wall and an inlet in said wall for introducing said effluent into said separator tank, said inlet being positioned adjacent said lower portion of said separator tank, said tank having an outlet in said wall in fluid communication with a drain; tank having an outlet in said wall in fluid communication with a drain;

a receptacle located in said upper portion of said separator tank, said receptacle being above and operably connected to said outlet on said wall of said separator tank, said receptacle having an upwardly oriented opening for receiving mixed water and solid matter;

a sloped grate for separating said solid matter from said water fraction, said sloped grate covering said upwardly oriented opening of said receptacle;

a pump for selectively transferring said lower water fraction and said solid matter therein from said lower portion of said separator tank to said receptacle, said pump having an inlet adjacent to and spaced from a lowermost portion of said sloped floor of said separator tank, said pump having an outlet in fluid communication with said opening of said receptacle and spaced above said sloped grate;

a pair of level sensors in said separator tank for actuating said deactuating said pump, said pair of level sensors including a first level sensor at a first predetermined level and a second level sensor at a second predetermined level, said first predetermined level being above said second predetermined level, said level sensors being designed to sense an interface level between said upper grease fraction and said lower water fraction, said level sensors automatically actuating said pump when said interface rises to said first predetermined level and automatically deactuating said pump when said interface falls to said second predetermined level;

a solid matter receptacle positioned below said slope grate and positioned so as to receive solid matter sliding downwardly and off of said sloped grate;

a weir positioned in said central portion of said separator tank, said weir having at least one substantially horizontal edge over which said upper grease fraction can overflow, said weir being above said first predetermined level;

a trough operatively connected to said weir for receiving grease overflowing from said upper grease fraction over said weir and for transferring said upper grease fraction to a grease receptacle, said trough extending through a passage in said wall of said separator tank and terminating above said grease receptacle, said grease receptacle being positioned outside said separator tank and in fluid communication with said trough.

* * * * *